US011718153B2

(12) United States Patent
Ryu et al.

(10) Patent No.: US 11,718,153 B2
(45) Date of Patent: Aug. 8, 2023

(54) AIR CONDITIONER FOR VEHICLES

(71) Applicant: Hanon Systems, Daejeon (KR)

(72) Inventors: Jae Chun Ryu, Daejeon (KR); Dae Bok Keon, Daejeon (KR); Yun Jin Kim, Daejeon (KR); Se Min Lee, Daejeon (KR)

(73) Assignee: Hanon Systems, Daejeon (KR)

( * ) Notice: Subject to any disclaimer, the term of this patent is extended or adjusted under 35 U.S.C. 154(b) by 191 days.

(21) Appl. No.: 17/188,314

(22) Filed: Mar. 1, 2021

(65) Prior Publication Data

US 2021/0178856 A1 Jun. 17, 2021

Related U.S. Application Data

(63) Continuation of application No. 15/946,259, filed on Apr. 5, 2018, now abandoned.

(30) Foreign Application Priority Data

Apr. 7, 2017 (KR) .................. 10-2017-0045134

(51) Int. Cl.
*B60H 1/00* (2006.01)
*B60H 1/14* (2006.01)

(52) U.S. Cl.
CPC ..... *B60H 1/00828* (2013.01); *B60H 1/00021* (2013.01); *B60H 1/00899* (2013.01); *B60H 1/143* (2013.01); *B60H 2001/00128* (2013.01); *B60H 2001/00178* (2013.01)

(58) Field of Classification Search
CPC ............ B60H 1/00828; B60H 1/00021; B60H 1/00514; B60H 1/143; B60H 2001/00128; B60H 2001/00178; B60H 1/00899
See application file for complete search history.

(56) References Cited

U.S. PATENT DOCUMENTS

| | | | |
|---|---|---|---|
| 2,984,087 A | 5/1961 | Folsom | |
| 3,143,864 A | 8/1964 | Schordine | |
| 3,995,446 A | 12/1976 | Eubank | |
| 4,412,425 A * | 11/1983 | Fukami | B60H 1/00021 62/244 |
| 4,566,531 A | 1/1986 | Stolz | |

(Continued)

FOREIGN PATENT DOCUMENTS

| | | |
|---|---|---|
| CN | 104972865 A | 10/2015 |
| CN | 205536760 U | 8/2016 |

(Continued)

*Primary Examiner* — Travis Ruby
(74) *Attorney, Agent, or Firm* — Norton Rose Fulbright US LLP; James R. Crawford

(57) ABSTRACT

Disclosed herein is an air conditioner for a vehicle, which can select a blower with the maximum efficiency within a range of a targeted air discharge volume for indoor circulation and select a blower with the maximum efficiency within a range of a targeted air discharge volume for outdoor discharge. The air conditioner includes: an air-conditioning case having a first air passageway and a second air passageway; an evaporator disposed on the first air passageway or the second air passageway; a condenser disposed on the first air passageway or the second air passageway; a first blower arranged on an indoor circulation passage; and a second blower arranged on an outdoor discharge passage.

7 Claims, 15 Drawing Sheets

(56) References Cited

U.S. PATENT DOCUMENTS

| | | | |
|---|---|---|---|
| 5,348,077 A | 9/1994 | Hillman | |
| 6,829,900 B2 | 12/2004 | Urch | |
| 9,610,822 B2 * | 4/2017 | Takahashi | B60H 1/00057 |
| 9,963,010 B2 | 5/2018 | Froehling et al. | |
| 10,040,333 B2 * | 8/2018 | Shin | B60H 1/00899 |
| 10,046,616 B2 | 8/2018 | Shin et al. | |
| 10,207,566 B2 * | 2/2019 | Shin | B60H 1/00899 |
| 2009/0193830 A1 * | 8/2009 | Yoshioka | B60H 1/00899 62/239 |
| 2016/0137023 A1 | 5/2016 | Park et al. | |
| 2021/0300155 A1 * | 9/2021 | Kanou | B60H 1/00849 |
| 2021/0323374 A1 * | 10/2021 | Shin | B60H 1/00057 |

FOREIGN PATENT DOCUMENTS

| | | |
|---|---|---|
| JP | 2011037434 A | 2/2011 |
| JP | 2013209006 A | 10/2013 |
| KR | 20160059030 A | 5/2016 |

* cited by examiner

PRIOR ART

AIR CONDITIONER FOR VEHICLES

CROSS REFERENCE TO RELATED APPLICATIONS

This application is a continuation of U.S. patent application Ser. No. 15/946,259 filed Apr. 5, 2018, pending, and claims priority from Korean Patent Application No. 10-2017-0045134 filed Apr. 7, 2017, each of which is hereby incorporated by reference in its entirety.

BACKGROUND OF THE INVENTION

Field of the Invention

The present invention relates to an air conditioner for a vehicle, and more particularly, to an air conditioner for a vehicle, which includes a heat pump system for providing integrated heating and cooling because an evaporator and a condenser are respectively mounted on a first air passageway and a second air passageway inside an air-conditioning case.

Background Art

In general, an air conditioner for a vehicle is an apparatus for cooling or heating the interior of the vehicle by cooling or heating through the process of introducing outdoor air into the interior of the vehicle or circulating indoor air of the vehicle. Such an air conditioner for a vehicle includes an evaporator for cooling the inside of an air-conditioning case; a heater core for heating the inside of the air-conditioning case; and a mode converting door for selectively blowing the air cooled by the evaporator or heated by the heater core toward parts of the interior of the vehicle.

Such an air conditioner includes: a compressor for compressing and discharging refrigerant; a condenser for condensing the refrigerant of high pressure discharged from the compressor; an expansion valve for throttling the refrigerant condensed and liquefied in the condenser; and an evaporator for exchanging heat between the liquefied refrigerant of low pressure throttled by the expansion valve and air blown to the interior of the vehicle and evaporating the refrigerant to cool the air discharged to the interior of the vehicle due to heat absorption by evaporative latent heat, and a cooling cycle of the air conditioner is configured such that the compressor, the condenser, the expansion valve and the evaporator are connected with each other via refrigeration pipes.

Recently, heat pump systems which perform heating and cooling only using the cooling cycle have been developed. FIG. 1 is a view showing a conventional heat pump system for a vehicle. As shown in FIG. 1, the heat pump system for the vehicle includes an air-conditioning case 10 in which a cold air passageway 11 and a warm air passageway are partitioned from each other, an evaporator 4 disposed on the cold air passageway 11 for cooling, and a condenser 2 disposed on the warm air passageway 12 for heating.

An air outflow port 15 for supplying air to the interior of the vehicle, and an air discharge port 16 for discharging air to the outside are formed at an outlet of the air-conditioning case 10. Blowers 20 are respectively disposed at inlets of the cold air passageway 11 and the warm air passageway 12 to be actuated individually.

In a cooling mode, the cold air cooled while passing the evaporator 4 of the cold air passageway 11 is discharged to the interior of the vehicle through the air outflow port 15 to cool the interior of the vehicle, and the warm air heated while passing the condenser 2 of the warm air passageway 12 is discharged to the outside of the vehicle through the air discharge port 16.

In a heating mode, the warm air heated while passing the condenser 2 of the warm air passageway 12 is discharged to the interior of the vehicle through the air outflow port 15 to heat the interior of the vehicle, and the cold air cooled while passing the evaporator 4 of the cold air passageway 11 is discharged to the outside of the vehicle through the air discharge port 16.

To sum up, the conventional heat pump system for a vehicle has blowers located in front of and/or behind a heat exchanger including the evaporator and the condenser. In the cooling mode, the indoor air exchanged heat with the evaporator 4 is re-circulated to the interior, and the outdoor air exchanged heat with the condenser 2 is discharged to the outside. In the heating mode, the indoor air exchanged heat with the condenser 2 is re-circulated to the interior, and the outdoor air exchanged heat with the evaporator 4 is discharged to the outside.

The conventional heat pump system for a vehicle has a disadvantage in that it requires a high specification because specification of the blowers must be set on the basis of the outside discharge air volume requiring a relatively high air volume. Moreover, the conventional heat pump system for a vehicle has another disadvantage in that the blowers are actuated in a low efficiency area when it is used for indoor circulation according to modes. That is, the heat pump system shows higher air-conditioning performance when the outside discharge air volume is large, but the heat pump system is not cost-effective because it must have a high-performance blower for the evaporator and a high-performance blower for the condenser in order to enhance air-conditioning performance.

Moreover, the conventional heat pump system for a vehicle uses an electric heater, such as a PTC heater, as an auxiliary heating means for satisfy a target indoor temperature, but it reduces the mileage of eco-friendly vehicles because of excessive power consumption.

Furthermore, the conventional heat pump system for a vehicle increases air flow resistance because the air passing through the condenser passes the PTC heater even in the cooling mode in which the PTC heater is not used.

SUMMARY OF THE INVENTION

Accordingly, the present invention has been made in view of the above-mentioned problems occurring in the prior art, and it is an object of the present invention to provide an air conditioner for a vehicle, which can select a blower with the maximum efficiency within a range of a targeted air discharge volume for indoor circulation and select a blower with the maximum efficiency within a range of a targeted air discharge volume for outdoor discharge.

It is another object of the present invention to provide an air conditioner for a vehicle, which can enhance heating performance utilizing waste heat of a compressor and prevent addition of unnecessary ventilating resistance in a cooling mode.

To accomplish the above object, according to the present invention, there is provided an air conditioner for a vehicle including: an air-conditioning case having a first air passageway and a second air passageway; an evaporator disposed on the first air passageway or the second air passageway; a condenser disposed on the first air passageway or the second air passageway; a first blower arranged on an indoor circulation passage; and a second blower arranged on an outdoor discharge passage.

As described above, the air conditioner for the vehicle according to an embodiment of the present invention can select a blower for a vent with low specification, which has a relatively low targeted air volume so as to obtain an effect of reducing manufacturing costs, and can enhance heating performance utilizing waste heat of a compressor and prevent addition of unnecessary ventilating resistance in a cooling mode.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, technical structure of an air conditioner for a vehicle according to exemplary embodiments of the present invention will be described with reference to the accompanying drawings.

Figure 1:
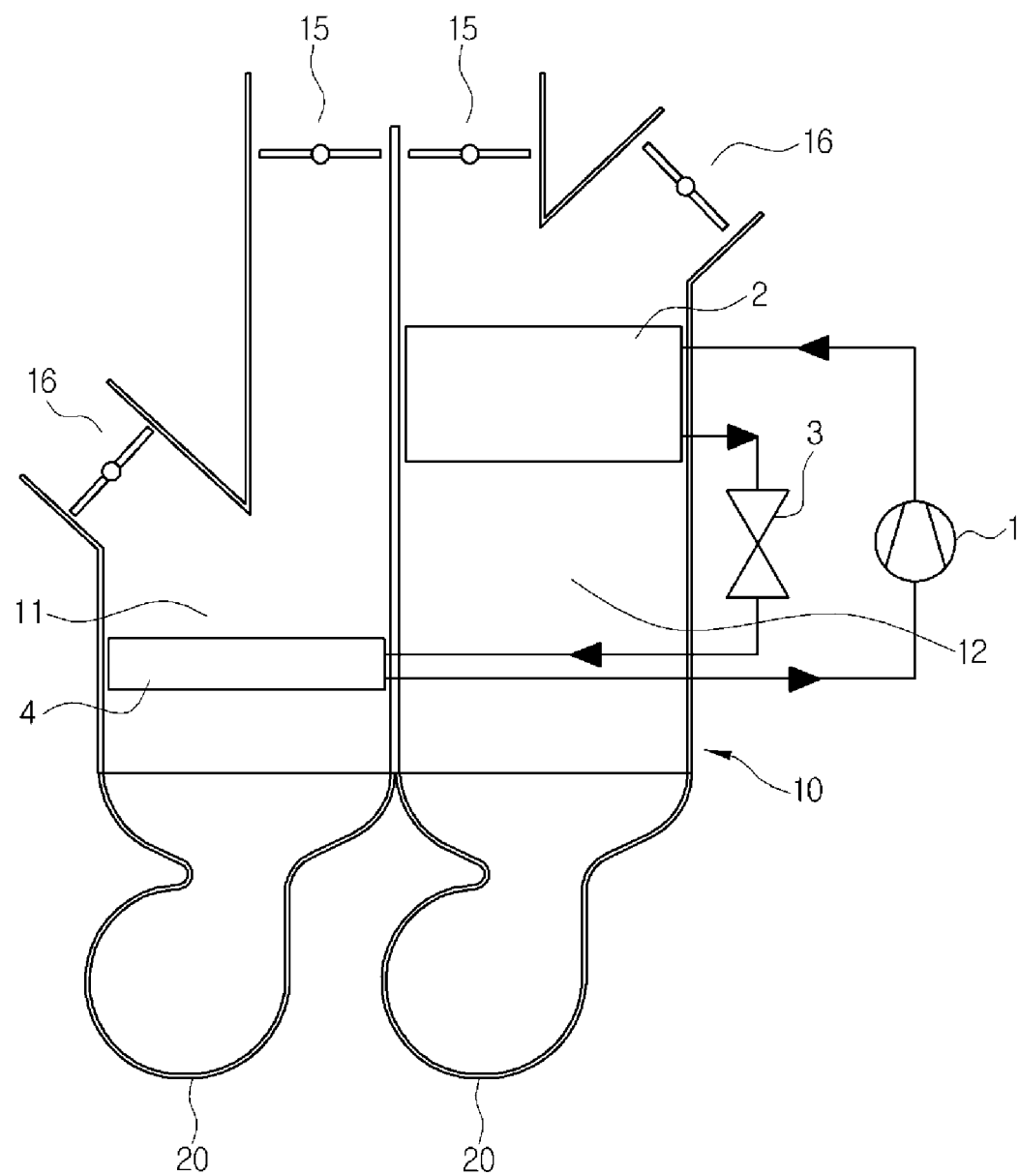
FIG. 1 is a view showing a conventional heat pump system for a vehicle.
Figure 2:
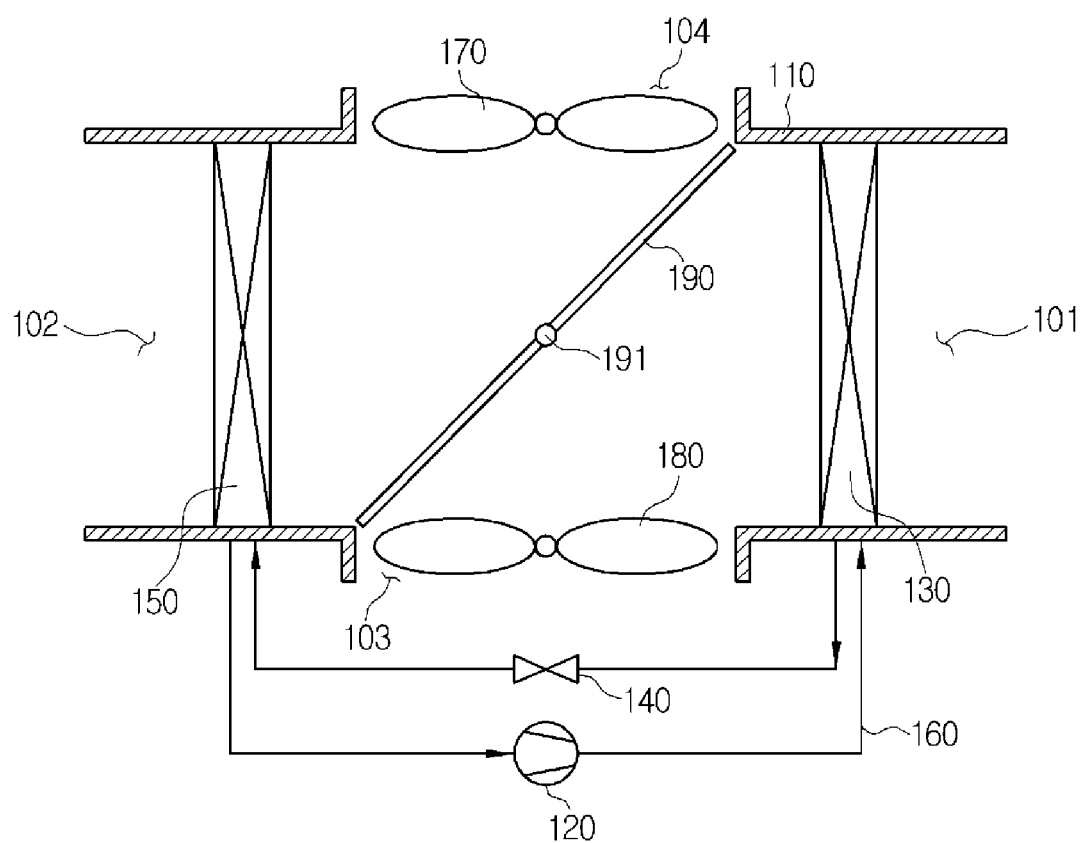
FIG. 2 is a view showing an air conditioner for a vehicle according to a first preferred embodiment of the present invention.
Figure 3:
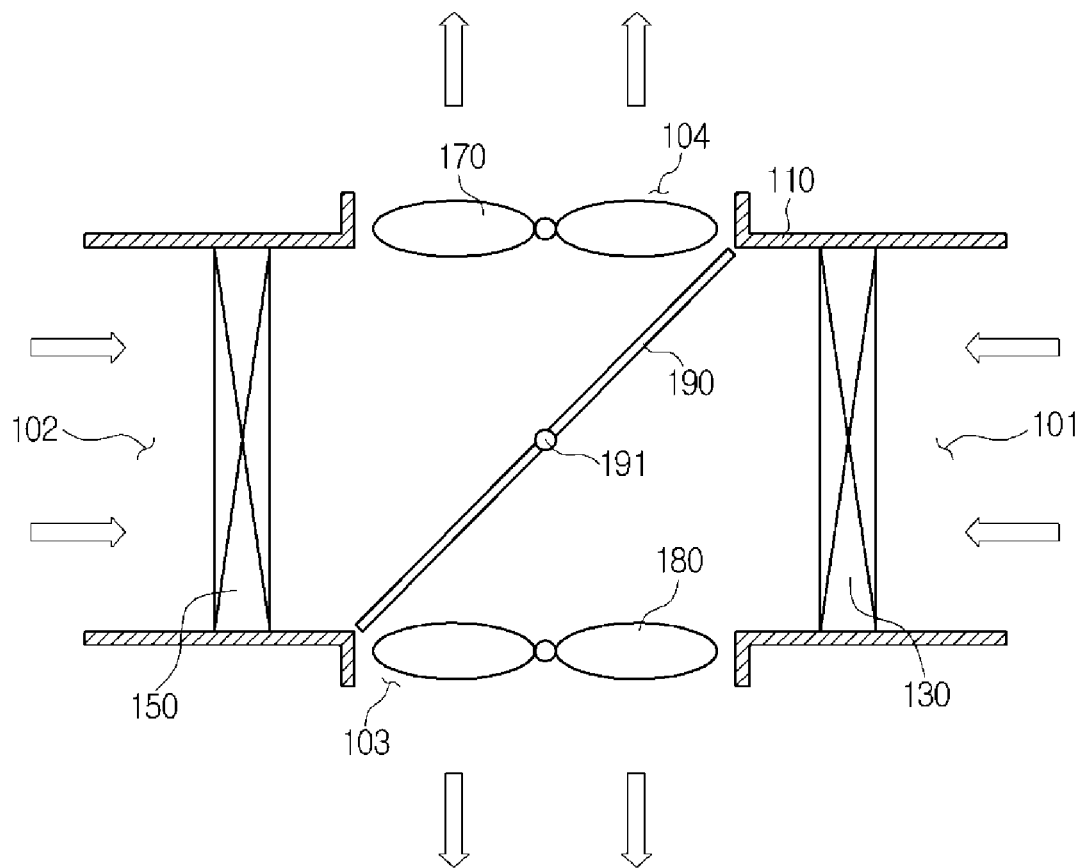
FIG. 3 is a view showing a cooling mode of the air conditioner for a vehicle according to the first preferred embodiment of the present invention.
Figure 4:
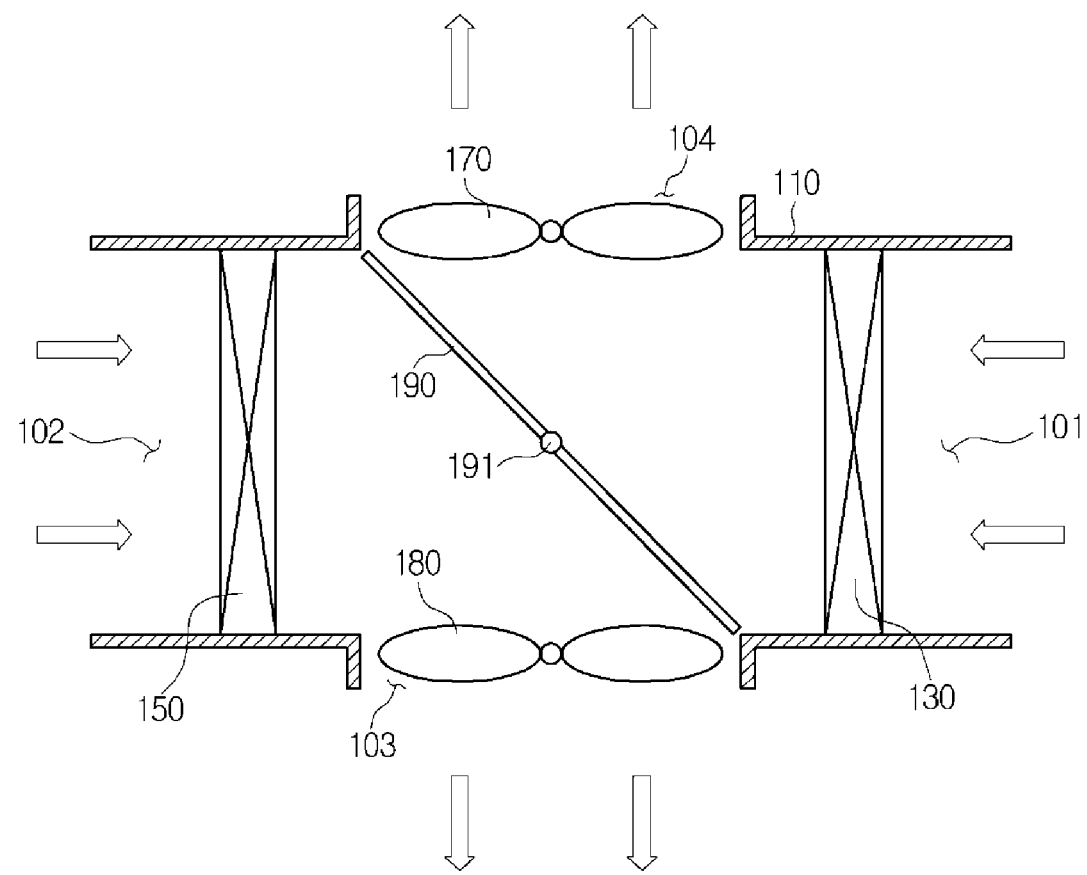
FIG. 4 is a view showing a heating mode of the air conditioner for a vehicle according to the first preferred embodiment of the present invention.

FIG. 2 is a view showing an air conditioner for a vehicle according to a first preferred embodiment of the present invention, FIG. 3 is a view showing a cooling mode of the air conditioner for a vehicle according to the first preferred embodiment of the present invention, and FIG. 4 is a view showing a heating mode of the air conditioner for a vehicle according to the first preferred embodiment of the present invention.

As shown in FIGS. 2 to 4, the air conditioner for the vehicle according to the first preferred embodiment of the present invention is configured by an integrated heat pump system, and includes an air-conditioning case 110, an evaporator 150, a condenser 130, a compressor 120, an expansion valve 140, a first blower 170, a second blower 180, and a door 190.

In the air-conditioning case 110, a first air passageway 101 and a second air passageway 102 are partitioned from each other. Through the first air passageway 101, indoor air and outdoor air are selectively introduced, and also through the second air passageway 102, indoor air and outdoor air are selective introduced. Moreover, the air-conditioning case 110 has an indoor circulation passage 104 and an outdoor discharge passage 103. The indoor circulation passage 104 is to supply inside air of the air-conditioning case 110 to the interior of the vehicle, and the outdoor discharge passage 103 is to discharge the inside air of the air-conditioning case 110 to the exterior of the vehicle.

The evaporator 150 is disposed on the second air passageway 102. The evaporator 150 exchanges heat between liquid-phase refrigerant of low pressure discharged from the expansion valve 140, which will be described later, and the inside air of the air-conditioning case 110 so as to cool air due to heat absorption by evaporative latent heat of refrigerant.

The condenser 130 is disposed on the first air passageway 101. The condenser 130 exchanges heat between gas-phase refrigerant of high-temperature and high-pressure discharged from the compressor 120, which will be described later. In this process, the refrigerant is condensed and air is heated.

The compressor 120 is an electro-compressor actuated by electric energy. The compressor 120 inhales and compresses gas-phase refrigerant of low-temperature and low-pressure passing through the evaporator 150, and then, discharges the refrigerant in a gas phase of high-temperature and high-pressure to the condenser 130.

The expansion valve 140 rapidly expands the liquid-phase refrigerant discharged from the condenser 130 by a throttling action, and sends the refrigerant in a wet-saturated state of low-temperature and low-pressure to the evaporator 150. The expansion valve 140 may adopt one of an EXV, a TXV, and an orifice structure.

The compressor 120, the condenser 130, the expansion valve 140 and the evaporator 150 are disposed on a refrigerant line 150 in order.

The first blower 170 is arranged on the indoor circulation passage 104. Furthermore, the second blower 180 is arranged on the outdoor discharge passage 103. The first blower 170 and the second blower 180 include fans and motors for operating the fans.

That is, the first blower is a blower for vents, which is mounted on an air passageway for indoor circulation, and the second blower is a blower for extractors, which is mounted on an air passageway for indoor and outdoor discharge. The second blower 180 may be a high performance blower which is more in air volume than the first blower 170.

The air conditioner for the vehicle according to the first preferred embodiment can select a blower with the maximum efficiency within a range of a targeted air discharge volume for indoor circulation and select a blower with the maximum efficiency within a range of a targeted air discharge volume for outdoor discharge. Finally, the blower, namely, the first blower, for vents with a relatively low target air volume can be selected at low specification (low cost) so as to obtain cost reduction effect.

The door 190 is disposed to be rotatable on a rotary shaft 191 inside the air-conditioning case 110. The door 190 is disposed at a portion where the first air passageway 101 and the second air passageway 102 meet together. Moreover, at the portion where the first air passageway 101 and the second air passageway 102 meet together, the indoor circulation passage 104 and the outdoor discharge passage 103 selectively communicate with the first air passageway 101 and the second air passageway 102.

In other words, the door 190 allows the first air passageway 101 and the indoor circulation passage 104 to communicate with each other and the second air passageway 102 and the outdoor discharge passage 103 to communicate with each other in the heating mode as shown in FIG. 4, or allows the first air passageway 101 and the outdoor discharge passage 103 to communicate with each other and the second air passageway 102 and the indoor circulation passage 104 to communicate with each other in the cooling mode as shown in FIG. 3.

The air conditioner for the vehicle is configured to selectively supply indoor air and outdoor air to the evaporator 150 and the condenser 130. As shown in FIG. 3, in the cooling mode, the indoor air exchanges heat with the evaporator 150 and is supplied to the interior of the vehicle, and the outdoor air exchanges heat with the condenser 130 and is discharged to the outside of the vehicle. As shown in FIG. 4, in the heating mode, the indoor air exchanges heat with the condenser 130 and is supplied to the interior of the vehicle, and the outdoor air exchanges heat with the evaporator 150 and is discharged to the outside of the vehicle.

The first blower 170 and the second blower 180 are disposed at the downstream side of the door 190 in an air flow direction. Through the above structure, the air conditioner for the vehicle can embody the cooling mode and the heating mode through the indoor circulation passage by one blower, namely, the first blower, and discharge non-available air through the outdoor discharge passage by the other blower, namely, the second blower.

Alternatively, the air conditioner for the vehicle may have a heat pump system configured to perform cooling and heating by one door and two outlets (the indoor circulation passage and the outdoor discharge passage), and includes the blower for indoor circulation and the blower for outdoor discharge, thereby preventing heat loss of the interior of the vehicle and carrying out effective air-conditioning through a simple structure.

Figure 5:
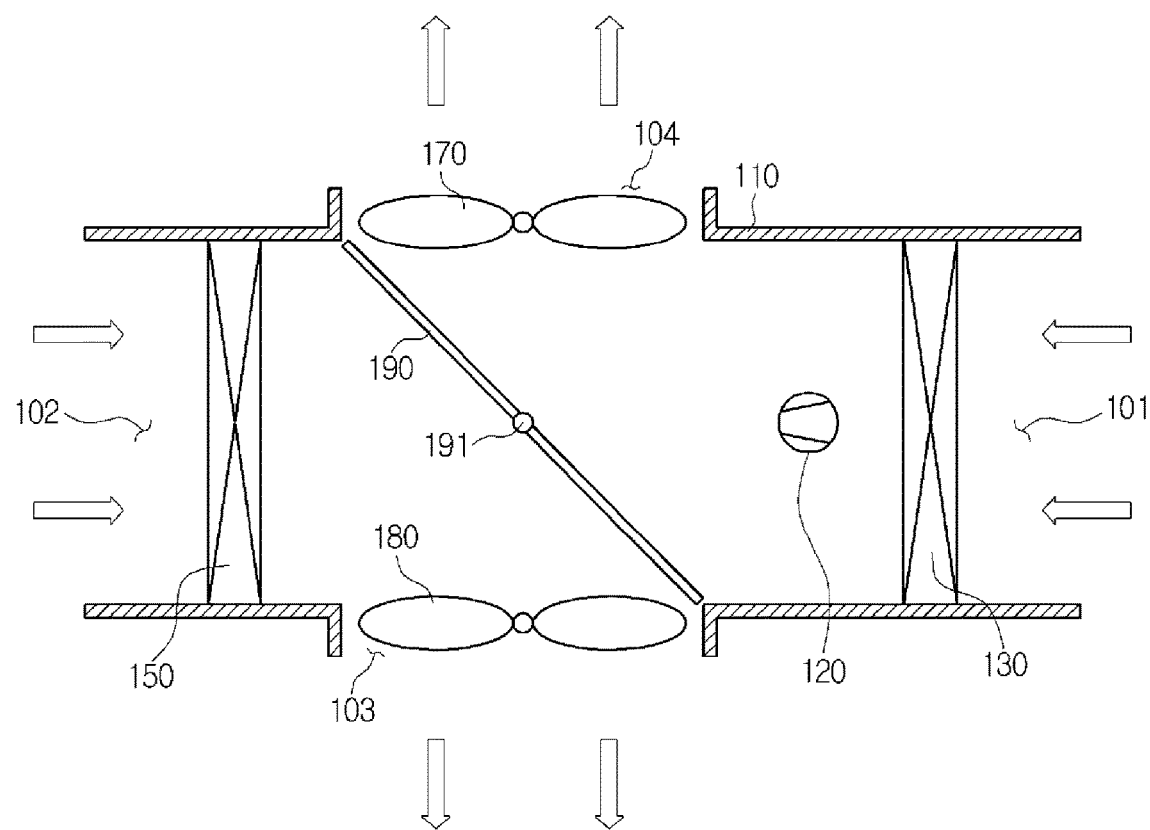
FIG. 5 is a view showing a heating mode of the air conditioner for a vehicle according to a second preferred embodiment of the present invention.

In the meantime, FIG. 5 is a view showing a heating mode of the air conditioner for a vehicle according to a second preferred embodiment of the present invention.

Referring to FIG. 5, the air conditioner for the vehicle according to the second preferred embodiment of the present invention is different from the first preferred embodiment in that arrangement of the compressor is optimized, and repeated description of the air conditioner will be omitted.

The compressor 120 compresses refrigerant passing through the evaporator 150 and discharges the compressed air toward the condenser 130. The compressor 120 is an electro compressor actuated by electric energy. The compressor 120 inhales and compresses gas-phase refrigerant of low-temperature and low-pressure passing through the evaporator 150, and discharges the refrigerant in a gas phase of high-temperature and high-pressure toward the condenser 130.

The compressor 120 is arranged on the first air passageway 101 in which the condenser 130 is arranged. The compressor 120 is a part including a motor for converting electric energy into rotational energy, and generates heat itself. Because the heat generated from the compressor 120 is waste heat, when the compressor 120 is arranged on the first air passageway 101, the waste heat may be used as a heating source for heating the interior of the vehicle.

It is preferable that the compressor 120 be disposed at the downstream side of the condenser 130 in the air flow direction. That is, the compressor 120 is disposed between the door 190 and the condenser 130. As shown in FIG. 5, in the heating mode, the indoor air exchanged heat with the condenser 130 is first heated, and then, is second heated by exchanging heat with a compressor body while passing through the compressor 120 arranged at the rear end of the condenser 130 so as to raise temperature of the air discharged to the interior of the vehicle.

Figure 6:
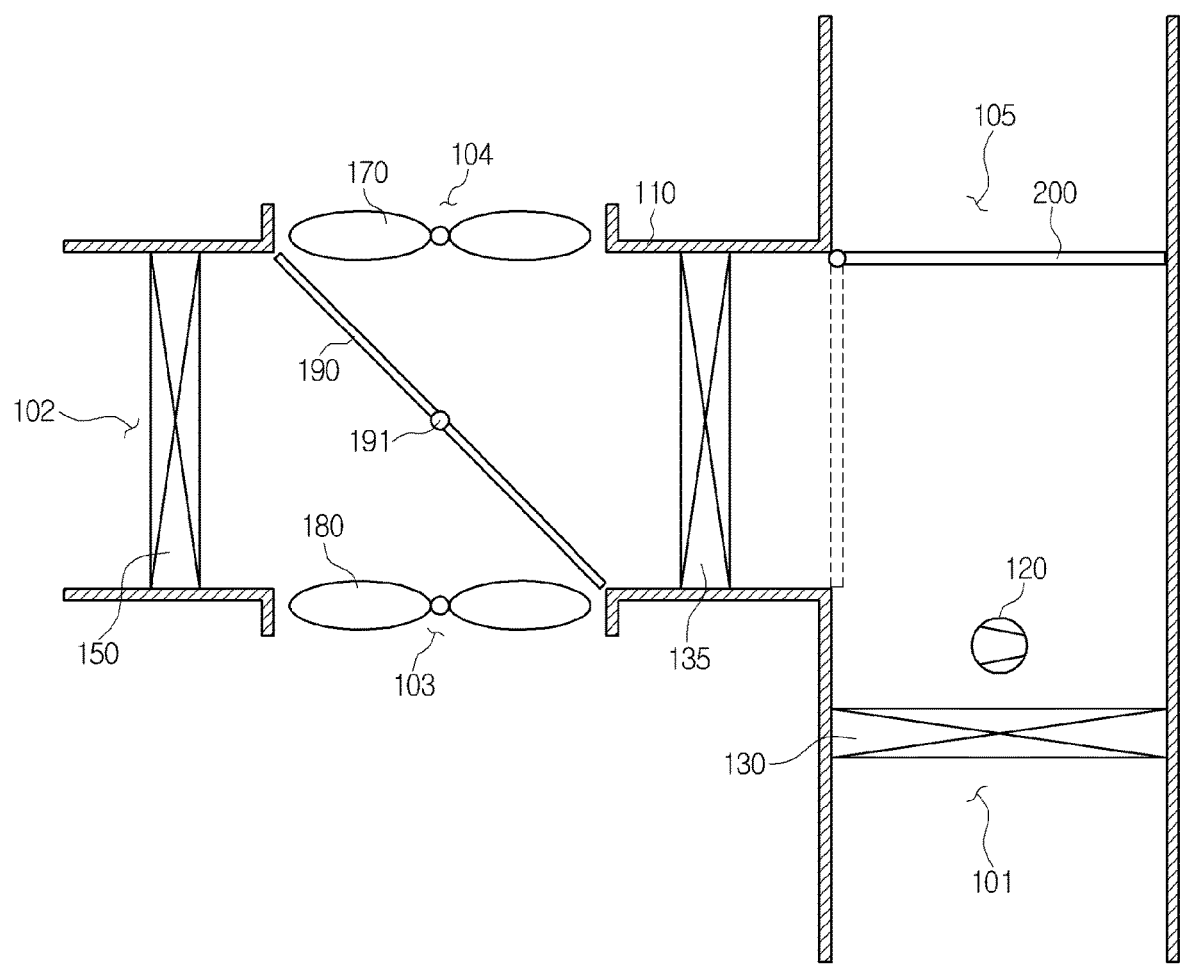
FIG. 6 is a view showing an air conditioner for a vehicle according to a third preferred embodiment of the present invention.
Figure 7:
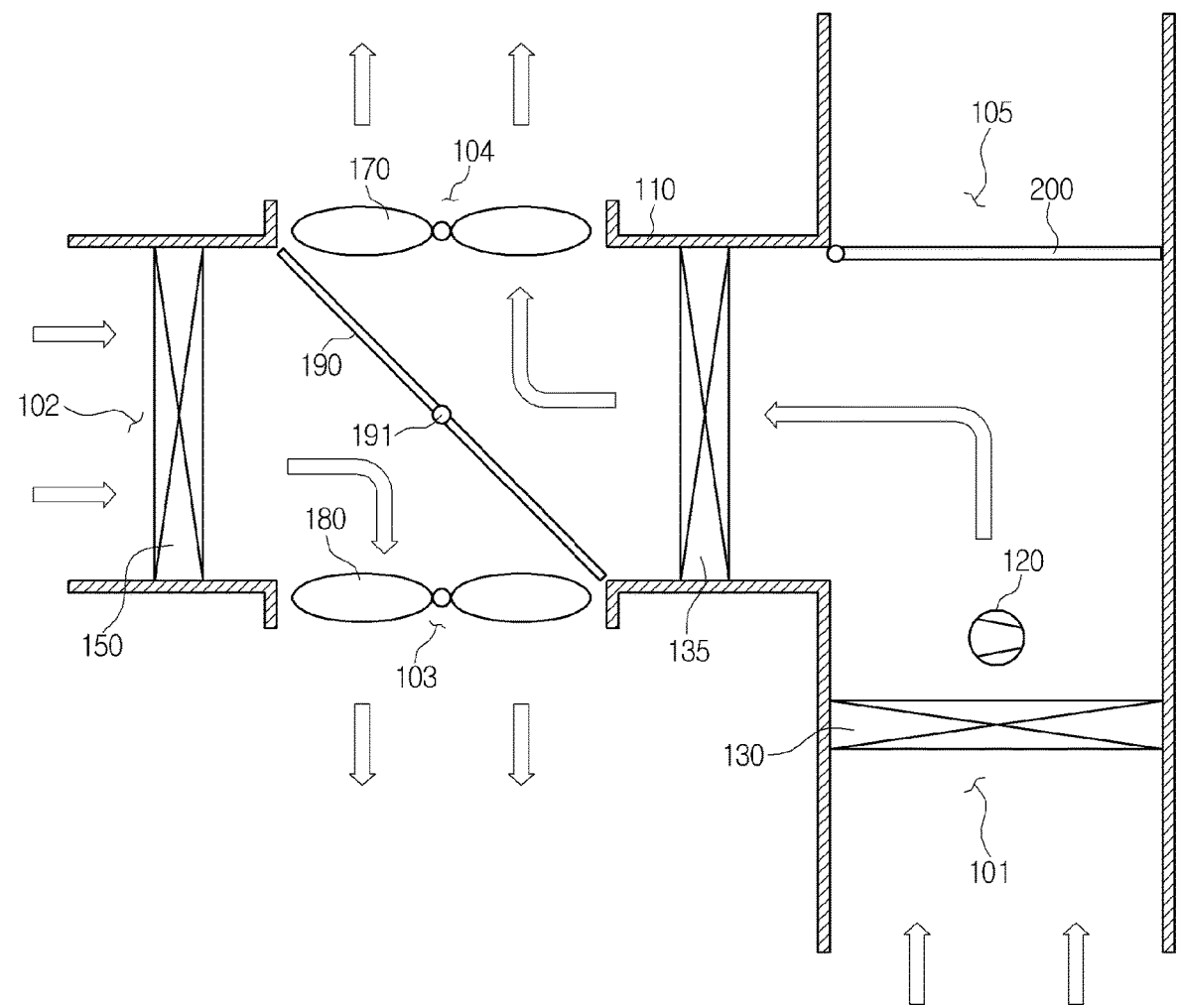
FIG. 7 is a view showing a heating mode of the air conditioner for a vehicle according to the third preferred embodiment of the present invention.
Figure 8:
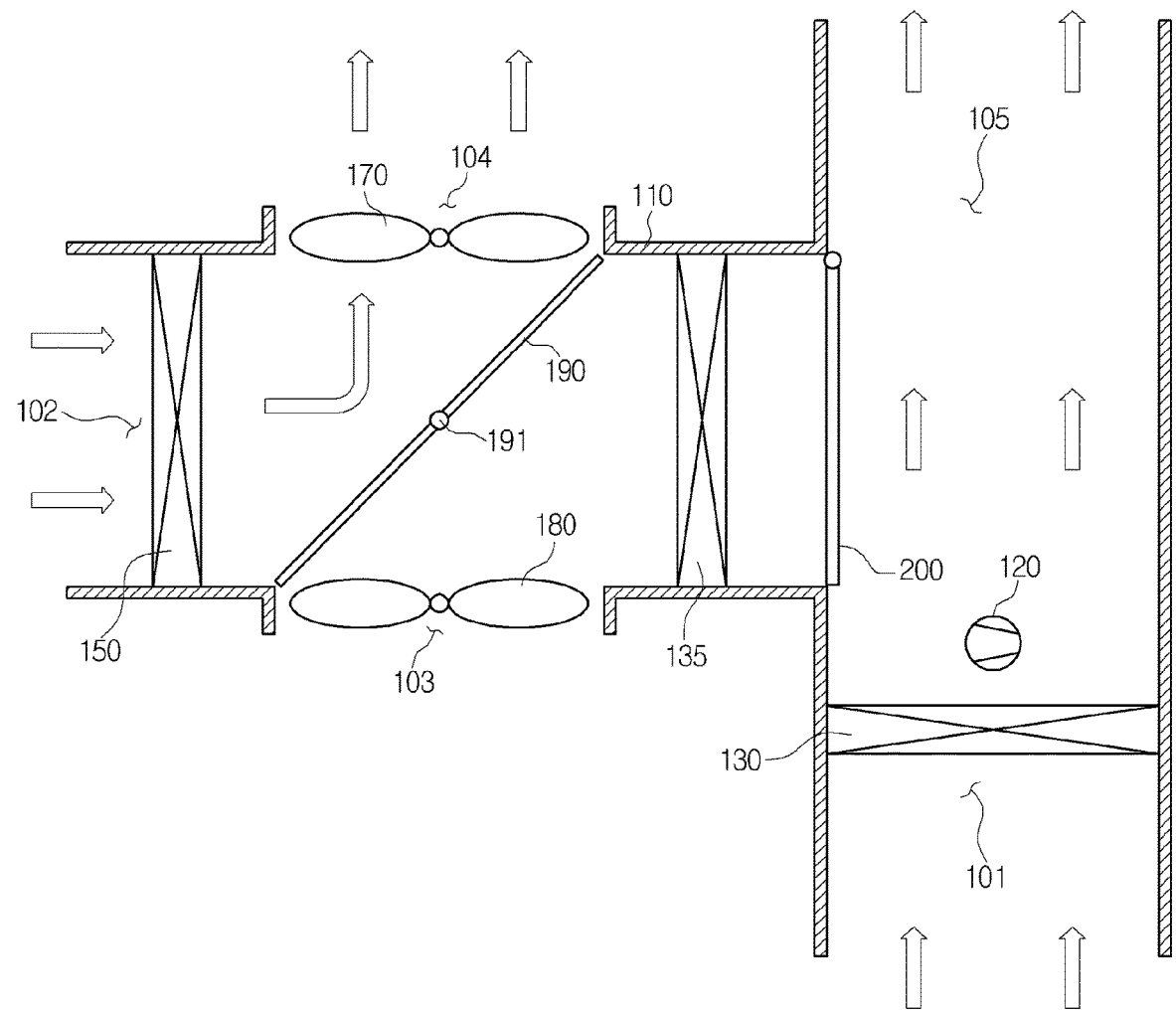
FIG. 8 is a view showing a cooling mode of the air conditioner for a vehicle according to the third preferred embodiment of the present invention.

In the meantime, FIG. 6 is a view showing an air conditioner for a vehicle according to a third preferred embodiment of the present invention, FIG. 7 is a view showing a heating mode of the air conditioner for a vehicle according to the third preferred embodiment of the present invention, and FIG. 8 is a view showing a cooling mode of the air conditioner for a vehicle according to the third preferred embodiment of the present invention.

Referring to FIGS. 6 to 8, the air conditioner for the vehicle according to the third preferred embodiment of the present invention is an integrated heat pump system, and includes an air-conditioning case 110, an evaporator 150, a condenser 130, a compressor 120, an expansion valve 140, a first blower 170, a second blower 180, a door 190, an electric heater 135, and a bypass door 200.

In the air-conditioning case 110, a first air passageway 101 and a second air passageway 102 are partitioned from each other. Through the first air passageway 101, indoor air and outdoor air are selectively introduced, and also through the second air passageway 102, indoor air and outdoor air are selective introduced. Moreover, the air-conditioning case 110 has an indoor circulation passage 104 and an outdoor discharge passage 103. The indoor circulation passage 104 is to supply inside air of the air-conditioning case 110 to the interior of the vehicle, and the outdoor discharge passage 103 is to discharge the inside air of the air-conditioning case 110 to the exterior of the vehicle.

The evaporator 150 is disposed on the second air passageway 102. The evaporator 150 exchanges heat between liquid-phase refrigerant of low pressure discharged from the expansion valve 140, which will be described later, and the inside air of the air-conditioning case 110 so as to cool air due to heat absorption by evaporative latent heat of refrigerant.

The condenser 130 is disposed on the first air passageway 101. The condenser 130 exchanges heat between gas-phase refrigerant of high-temperature and high-pressure discharged from the compressor 120, which will be described later. In this process, the refrigerant is condensed and air is heated.

The compressor 120 is an electro-compressor actuated by electric energy. The compressor 120 inhales and compresses gas-phase refrigerant of low-temperature and low-pressure passing through the evaporator 150, and then, discharges the refrigerant in a gas phase of high-temperature and high-pressure to the condenser 130.

The expansion valve 140 rapidly expands the liquid-phase refrigerant discharged from the condenser 130 by a throttling action, and sends the refrigerant in a wet-saturated state of low-temperature and low-pressure to the evaporator 150. The expansion valve 140 may adopt one of an EXV, a TXV, and an orifice structure.

The compressor 120, the condenser 130, the expansion valve 140 and the evaporator 150 are disposed on a refrigerant line 150 in order.

The first blower 170 is arranged on the indoor circulation passage 104. Furthermore, the second blower 180 is arranged on the outdoor discharge passage 103. The first blower 170 and the second blower 180 include fans and motors for operating the fans.

The door 190 is disposed to be able to rotate on a rotary shaft 191 inside the air-conditioning case 110. The door 190 is disposed at a portion where the first air passageway 101 and the second air passageway 102 meet together. Moreover, at the portion where the first air passageway 101 and the second air passageway 102 meet together, the indoor circulation passage 104 and the outdoor discharge passage 103 selectively communicate with the first air passageway 101 and the second air passageway 102.

The first blower 170 and the second blower 180 are disposed at the downstream side of the door 190 in an air flow direction. However, the first blower 170 and the second blower 180 may be disposed at an air inlet side of the air-conditioning case 110, which corresponds to the upstream side of the door 190.

Moreover, the air-conditioning case 110 further includes an auxiliary outdoor discharge passage 105 for bypassing the air passing through the condenser 130 toward the outdoor discharge passage 103 and discharging the air to the outside.

The electric heater 135 is a PTC heater which generates heat using electric energy, and is disposed on the first air passageway 101 in which the condenser 130 is arranged. The electric heater 135 is arranged at the downstream side of the condenser 130 in the air flow direction. The electric heater 135 is an auxiliary heating source, and heats air by exchanging heat with the air passing the electric heater 135. The indoor air exchanged heat with the condenser 130 is first heated, and then, is second heated by exchanging heat with a compressor body while passing through the electric heater 135 arranged at the rear end of the condenser 130 so as to raise temperature of the air discharged to the interior of the vehicle.

The bypass door 200 controls the air passing through the condenser 130 to selectively pass the auxiliary outdoor discharge passage 105 or bypass the auxiliary outdoor discharge passage 105. The bypass door 200 is rotatably disposed inside the air-conditioning case 110. The bypass door 200 opens the first air passageway 101 and closes the auxiliary outdoor discharge passage 105 so that the air passing through the condenser 130 flows toward the door 190 as shown in FIG. 7, or opens the auxiliary outdoor discharge passage 105 so that the air passing through the condenser 130 is discharged out, and closes the air passageway directing the door 190 as shown in FIG. 8.

The air conditioner for the vehicle according to the third preferred embodiment is configured such that the air passing through the condenser 130 flows toward the outdoor discharge passage 103 only in the first air-conditioning mode and is discharged out through the auxiliary outdoor discharge passage 105 in the second air-conditioning mode. In this case, the first air-conditioning mode is the heating mode, and the second air-conditioning mode is the cooling mode.

The electric heater 135 is arranged at the downstream side of the bypass door 200 in the air flow direction. In more detail, the electric heater 135 is arranged between the door 190 and the bypass door 200. Through the above structure, as shown in FIG. 7, in the heating mode, the electric heater 135 serves as a heating source by exchanging heat with the air blown to the interior of the vehicle, and as shown in FIG. 8, in the cooling mode, the air passing through the condenser 130 does not pass the electric heater 135 but is directly discharged out through the auxiliary outdoor discharge passage 105 so as to reduce unnecessary ventilating resistance to prevent lowering of air volume.

Figure 9:
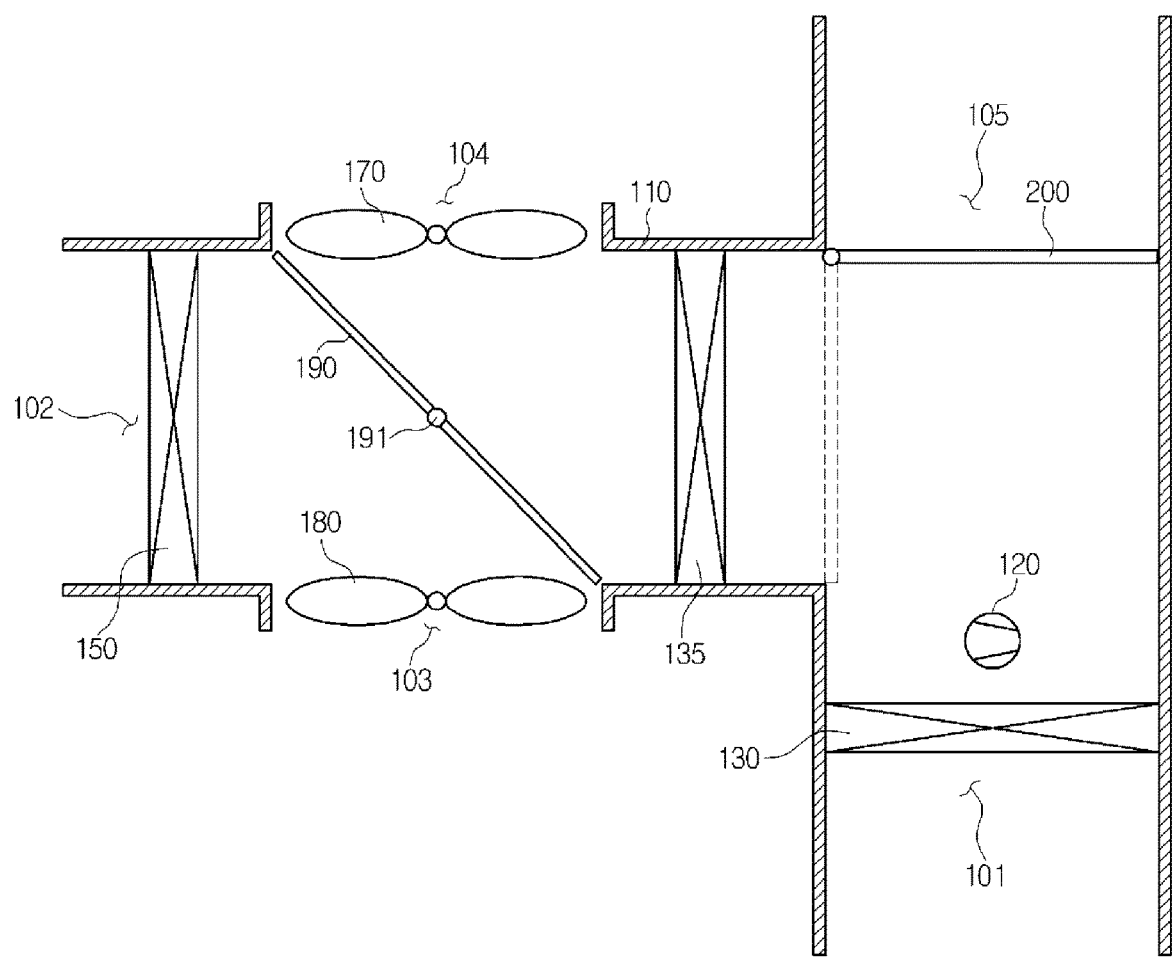
FIG. 9 is a view showing an air conditioner for a vehicle according to a modification of FIG. 6.

In the meantime, FIG. 9 is a view showing an air conditioner for a vehicle according to a modification of FIG. 6. Referring to FIG. 9, when the compressor 120 is arranged on the first air passageway 101, the waste heat generated from the compressor 120 may be utilized as a heating source. That is, the indoor air exchanged heat with the condenser 130 is first heated, is second heated while passing through the compressor 120 arranged at the rear end of the condenser 130, and then, is third heated while passing the electric heater 135 so as to raise temperature of the air discharged to the interior of the vehicle.

Moreover, it is also possible to arrange the compressor 120 at the downstream side of the electric heater 135 in the air flow direction.

Figure 10:
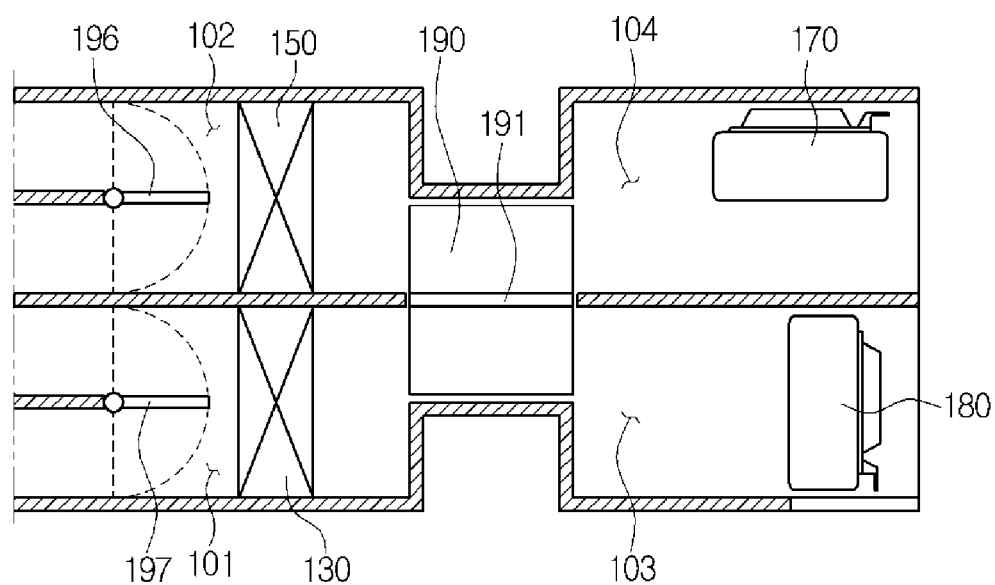
FIG. 10 is a sectional view showing an air conditioner for a vehicle according to a fourth preferred embodiment of the present invention.

Meanwhile, FIG. 10 is a sectional view showing an air conditioner for a vehicle according to a fourth preferred embodiment of the present invention.

Referring to FIG. 10, the air conditioner for the vehicle according to the fourth preferred embodiment includes an air-conditioning case, an evaporator 150, a condenser 130, a first blower 170, a second blower 180, and a door 190.

In the air-conditioning case 110, a first air passageway 101 and a second air passageway 102 are partitioned from each other. Through the first air passageway 101, indoor air and outdoor air are selectively introduced, and also through the second air passageway 102, indoor air and outdoor air are selective introduced. Moreover, the air-conditioning case 110 has an indoor circulation passage 104 and an outdoor discharge passage 103. The indoor circulation passage 104 is to supply inside air of the air-conditioning case 110 to the interior of the vehicle, and the outdoor discharge passage 103 is to discharge the inside air of the air-conditioning case 110 to the exterior of the vehicle. The evaporator 150 is disposed on the second air passageway 102. The condenser 130 is disposed on the first air passageway 101.

The air-conditioning case includes a first indoor and outdoor air converting door 197 and a second indoor and outdoor air converting door 196 disposed at an air inlet side thereof. The first indoor and outdoor air converting door 197 is disposed on the first air passageway 101 to selectively introduce indoor air and outdoor air to the first air passageway 101, and the second indoor and outdoor air converting door 196 is disposed on the second air passageway 102 to selectively introduce indoor air and outdoor air to the second air passageway 102.

The first blower 170 is arranged on the indoor circulation passage 104. Furthermore, the second blower 180 is arranged on the outdoor discharge passage 103. The first blower 170 and the second blower 180 include fans and motors for actuating the fans. The first blower 170 and the second blower 180 are arranged at the downstream side of the evaporator 150 and the condenser 130 in the air flow direction. The first blower 170 and the second blower 180 are formed in a suction type to inhale air.

Figure 11:
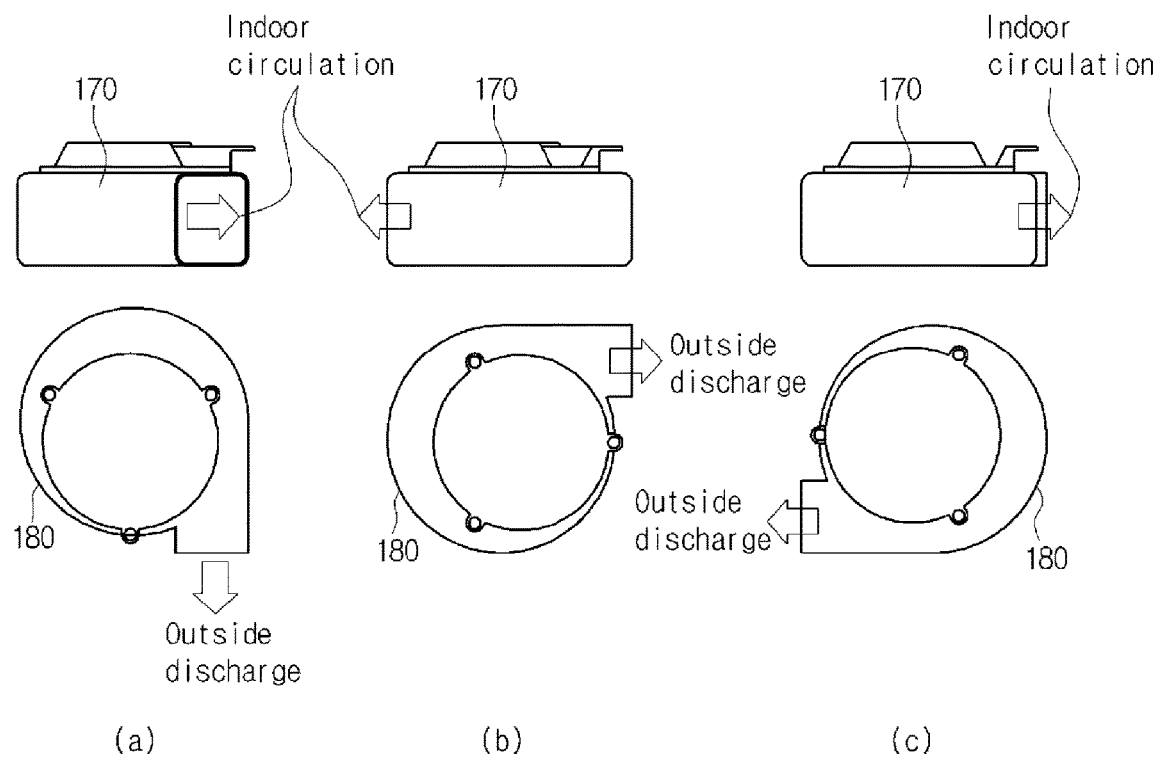
FIG. 11 is a view showing various arrangement states of a first blower and a second blower of the air conditioner for a vehicle according to the fourth preferred embodiment of the present invention.

The first blower 170 and the second blower 180 are arranged at right angles to each other. That is, a rotary shaft of the first blower fan and a rotary shaft of the second blower fan are arranged at right angles to each other. FIG. 11 is a view showing various arrangement states of the first blower and the second blower of the air conditioner for a vehicle according to the fourth preferred embodiment of the present invention. Referring to FIG. 11, because two suction type blowers are arranged at right angles to each other, when the blowers are rotated, as shown in FIGS. 11A, 11B and 11C, the discharge direction for indoor circulation (vent) and outdoor discharge (extractor) can be freely changed. Therefore, the air conditioner for the vehicle using the two suction type blowers can improve adaptability to vehicles.

The door 190 is disposed at a portion where the first air passageway 101 and the second air passageway 102 meet together. Moreover, at the portion where the first air passageway 101 and the second air passageway 102 meet together, the indoor circulation passage 104 and the outdoor discharge passage 103 selectively communicate with the first air passageway 101 and the second air passageway 102.

Figure 12:
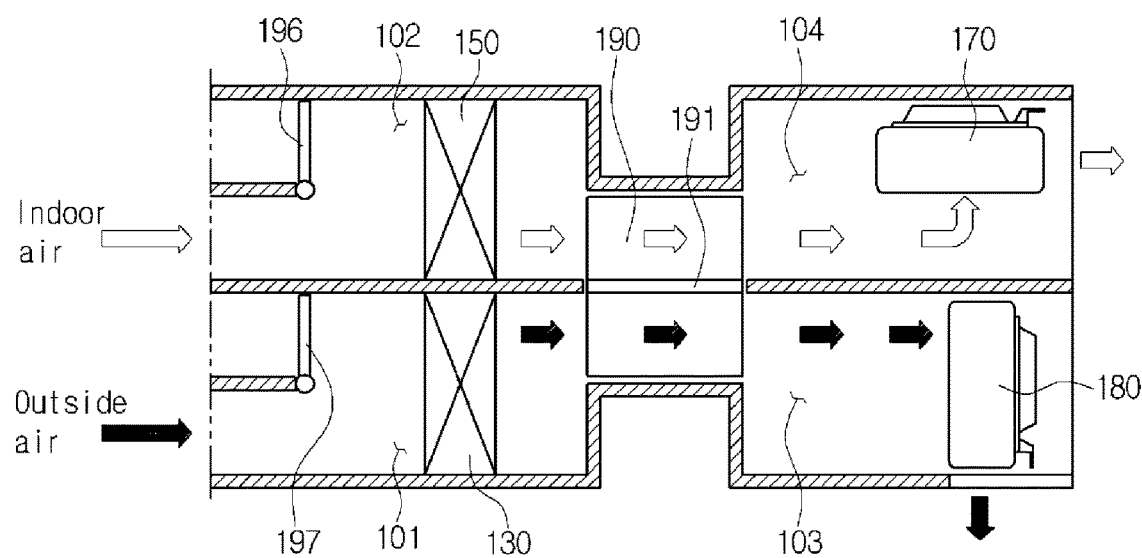
FIG. 12 is a view showing a cooling mode of the air conditioner for a vehicle according to the fourth preferred embodiment of the present invention.
Figure 13:
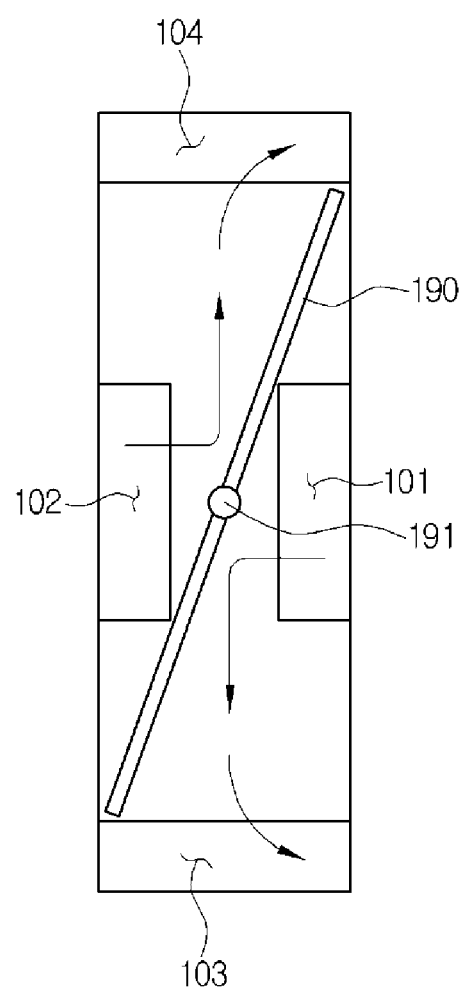
FIG. 13 is a side sectional view of a door of FIG. 12.

FIG. 12 is a view showing a cooling mode of the air conditioner for a vehicle according to the fourth preferred embodiment of the present invention, and FIG. 13 is a side sectional view of a door of FIG. 12.

Referring to FIGS. 12 and 13, in the cooling mode, the door 190 allows the first air passageway 101 and the outdoor discharge passage 103 to communicate with each other, and the second air passageway 102 and the indoor circulation passage 104 to communicate with each other. The indoor air introduced by manipulation of the second indoor and outdoor air converting door 196 is cooled while passing the evaporator 150 along the second air passageway 102, and then, circulates the interior of the vehicle through the indoor circulation passage 104 by manipulation of the door 190. The outdoor air introduced by manipulation of the first indoor and outdoor air converting door 197 is heated while passing the condenser 130 along the first air passageway 101, and then, is discharged to the outside of the vehicle through the outdoor discharge passage 103 by manipulation of the door 190.

Figure 14:
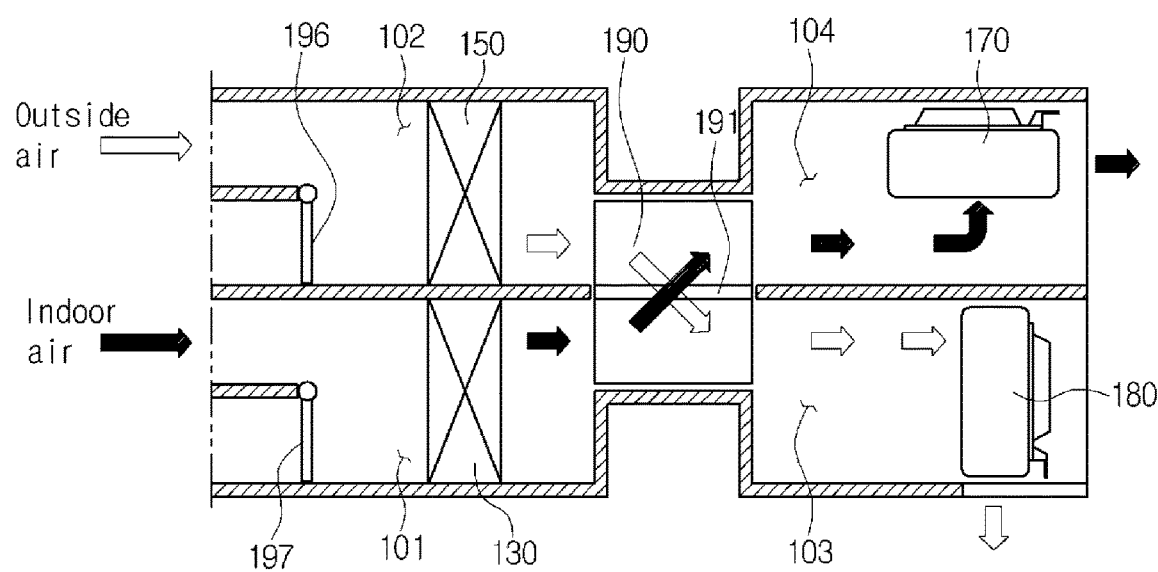
FIG. 14 is a view showing a heating mode of the air conditioner for a vehicle according to the fourth preferred embodiment of the present invention.
Figure 15:
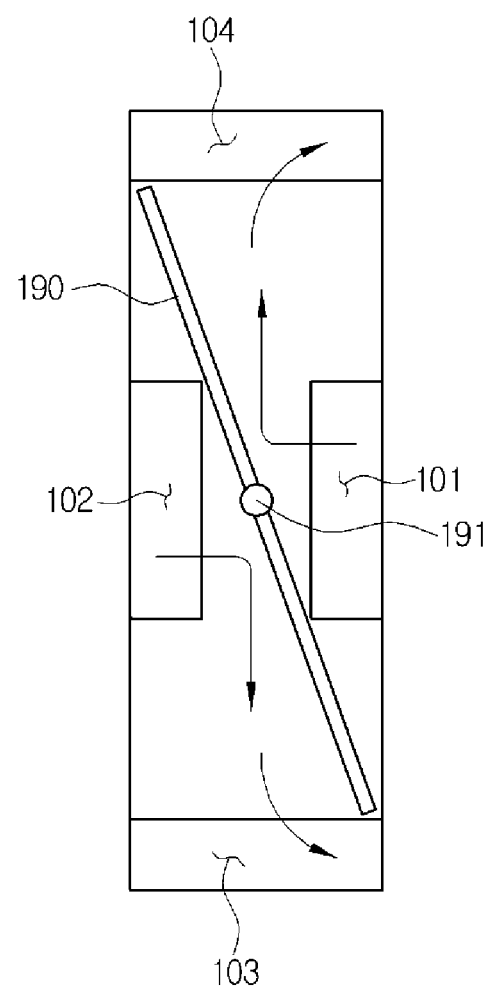
FIG. 15 is a side sectional view of a door of FIG. 14.

FIG. 14 is a view showing a heating mode of the air conditioner for a vehicle according to the fourth preferred embodiment of the present invention, and FIG. 15 is a side sectional view of a door of FIG. 14. Referring to FIGS. 14 and 15, in the heating mode, the door 190 allows the first air passageway 101 and the indoor circulation passage 104 to communicate with each other, and the second air passageway 102 and the outdoor discharge passage 103 to communicate with each other. The outdoor air introduced by manipulation of the second indoor and outdoor air converting door 196 is cooled while passing the evaporator 150 along the second air passageway 102, and then, is discharged to the outside of the vehicle through the outdoor discharge passage 103 by manipulation of the door 190. The outdoor air introduced by manipulation of the first indoor and outdoor air converting door 197 is heated while passing the condenser 130 along the first air passageway 101, and then, circulates the interior of the vehicle through the indoor circulation passage 104 by manipulation of the door 190.

While the present invention has been particularly shown and described with reference to exemplary embodiments thereof, it will be understood by those of ordinary skill in the art that various modifications and equivalents may be made without deviating from the spirit or scope of the invention. Therefore, it would be understood that the technical and protective scope of the present invention shall be defined by the technical idea as defined by the following claims and the equivalences.

What is claimed is:

1. An air conditioner for a vehicle comprising:
    an air-conditioning case having a first air passageway and a second air passageway;
    an evaporator disposed on the second air passageway;
    a condenser disposed on the first air passageway;
    a first blower arranged on an indoor circulation passage;
    a second blower arranged on an outdoor discharge passage;
    a door allowing the indoor circulation passage and the outdoor discharge passage to selectively communicate with the first air passageway and the second air passageway;
    an electric heater disposed on the first air passageway on which the condenser is arranged;
    an auxiliary outdoor discharge passage, which bypasses the air passing through the condenser to the outdoor discharge passage to discharge the air to the outside; and
    a bypass door which controls the air passing through the condenser to selectively pass through the auxiliary outdoor discharge passage or through the electric heater.

2. The air conditioner according to claim 1, wherein the first blower and the second blower are disposed at the downstream side of the door in an air flow direction.

3. The air conditioner according to claim 1, wherein the second blower is higher in air volume than the first blower.

4. The air conditioner according to claim 1, wherein the air passing through the condenser flows to the outdoor discharge passage in a heating mode and the air passing through the condenser is discharged through the auxiliary outdoor discharge passage in a cooling mode.

5. The air conditioner according to claim 1, further comprising:
    a compressor which compresses refrigerant passing through the evaporator and discharges the compressed refrigerant to the condenser, wherein the compressor is arranged on the first air passageway on which the condenser is arranged.

6. The air conditioner according to claim 5, wherein the compressor is disposed at the downstream side of the condenser in the air flow direction.

7. The air conditioner according to claim 1, wherein the electric heater is arranged between the door and the bypass door.

* * * * *